US011416618B2

(12) United States Patent
Mathane et al.

(10) Patent No.: US 11,416,618 B2
(45) Date of Patent: Aug. 16, 2022

(54) BIDIRECTIONAL TRUST CHAINING FOR TRUSTED BOOT

(71) Applicant: Dell Products, L.P., Round Rock, TX (US)

(72) Inventors: Sudhir Mathane, Leander, TX (US); Ricardo L. Martinez, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 381 days.

(21) Appl. No.: 16/512,077

(22) Filed: Jul. 15, 2019

(65) Prior Publication Data

US 2021/0019419 A1 Jan. 21, 2021

(51) Int. Cl.
*G06F 21/57* (2013.01)
*G06F 9/445* (2018.01)

(52) U.S. Cl.
CPC ............ *G06F 21/575* (2013.01); *G06F 9/445* (2013.01); *G06F 21/572* (2013.01); *G06F 2211/1097* (2013.01); *G06F 2221/2129* (2013.01)

(58) Field of Classification Search
CPC ...... G06F 21/575; G06F 9/445; G06F 21/572; G06F 2211/1097; G06F 2221/2129
See application file for complete search history.

(56) References Cited

U.S. PATENT DOCUMENTS

| | | | | |
|---|---|---|---|---|
| 2006/0059224 | A1* | 3/2006 | Yao | H04L 12/1868 709/201 |
| 2014/0164774 | A1* | 6/2014 | Nord | G06F 9/00 713/171 |
| 2018/0167219 | A1* | 6/2018 | Campagna | H04L 9/0822 |
| 2018/0373878 | A1* | 12/2018 | Jung | H04L 9/0861 |

* cited by examiner

*Primary Examiner* — Jaweed A Abbaszadeh
*Assistant Examiner* — Hyun Soo Kim
(74) *Attorney, Agent, or Firm* — Fogarty LLP

(57) ABSTRACT

A root of trust may include one or more hardware components of an IHS (Information Handling System) that operate using validated hardware instructions. Once a root of trust has been established, it may be extended by validating additional components and the instructions by which these components operate. A chain of trusted boot components may be used to securely initialize a set of components required to support core functions of the IHS. In order to detect components of a trusted boot chain that have been compromised, boot chain components validate their own instructions as well as the instructions to be utilized by the next boot component and the instructions utilized by the prior boot component, thus providing bidirectional validation of trusted boot chain components.

20 Claims, 5 Drawing Sheets

BIDIRECTIONAL TRUST CHAINING FOR TRUSTED BOOT

FIELD

The present disclosure generally relates to Information Handling Systems (IHSs), and, more particularly, to systems and methods for securely initializing and operating IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

During initialization of an IHS, a root of trust may be established in one or more hardware components of the IHS by validating the integrity of the instructions, such as firmware instructions, utilized by the hardware components. A hardware component that has been established as being trusted may then serve as an anchor that may be used to validate the integrity of additional hardware components of the IHS, thus extending the scope of the trusted hardware of the IHS. In this manner, an IHS may be securely initialized only after the integrity of a requisite set of hardware components has been validated. The trusted hardware of an IHS may then be used to operate a secure execution environment.

In certain instances, a root of trusted hardware components of an IHS may be organized as a chain of trusted boot components that may utilize a progressive component verification scheme. In the progressive verification of a trusted chain of boot components, once a boot component has been verified, that trusted boot component loads and verifies the next boot component in the chain. This flow continues until the final component in the chain of trusted boot components has been loaded and verified. A progressive component verification scheme provides a flexible mechanism for establishing a root of trust. However, if a component in the trusted boot chain is compromised, the compromised component may load malicious instructions and components as part of the boot chain, thus compromising the security of all aspects of an IHS.

SUMMARY

Various embodiments provide a method for validating an ordered sequence of boot components of an Information Handling System (IHS). The method includes: retrieving an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions of the current boot component and further based on a hash of hardware instructions of the prior boot component; authenticating the digital signature; calculating a hash based on the hardware instructions of the current boot component and further based on a hash value of hardware instructions for the operation of the prior boot component; comparing the calculated hash and the reference hash to verify an integrity of the hardware instructions of current boot component and the hardware instructions of the prior boot component; and initiating validation of a next boot component of the sequence of boot components, wherein the next boot component directly follows the current boot component in the ordered sequence of boot components.

In additional method embodiments, the image is stored on a memory device of the IHS during a trusted assembly procedure of the IHS. In additional method embodiments, the digital signature is generated by encrypting the reference hash that is based on the hardware instructions of the current boot component and further based on the hash of the prior boot component. In additional method embodiments, the authentication of the digital signature comprises decrypting the digital signature to recover the reference hash. In additional method embodiments, the image further comprises attributes for configuring the current boot component and wherein the digital signature is further generated based on encrypting the attributes. In additional method embodiments, the image is retrieved based on validated hardware instructions of the prior boot component. In additional embodiments, the method further includes retrieving an image of the prior boot component of the sequence of boot components, wherein the image comprises hardware instructions for operation of the prior boot component; calculating a hash based on the hardware instructions of the prior boot component; and verifying an integrity of the hardware instructions of the prior boot component based on a comparison of the calculated hash of the prior boot component instructions versus a reference hash of the prior boot component. In additional method embodiments, the image of the current boot component comprises the reference hash of the prior boot component.

In various additional embodiments, an Information Handling System (IHS) includes: a flash memory; and an embedded controller coupled to the flash memory, wherein the embedded controller is configured to: retrieve, from the flash memory, an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions of the current boot component and further based on a hash of hardware instructions of the prior boot component; authenticate the digital signature; calculate a hash based on the hardware instructions of the current boot component and further based on a hash value of hardware instructions for the operation of the prior boot component; compare the calculated hash and the reference hash to verify an integrity of the hardware instructions of current boot component and the hardware instructions of the prior boot component; and initiate validation of a next boot component of the sequence of boot components, wherein the next boot component directly follows the current boot component in the ordered sequence of boot components.

In additional IHS embodiments, the image is stored in the flash memory during a trusted assembly procedure of the IHS. In additional IHS embodiments, the digital signature is generated by encrypting the reference hash that is based on the hardware instructions of the current boot component and further based on the hash of the prior boot component. In additional IHS embodiments, the authentication of the digital signature comprises decrypting the digital signature to recover the reference hash. In additional IHS embodiments, the image further comprises attributes for configuring the current boot component and wherein the digital signature is further generated based on encrypting the attributes. In additional IHS embodiments, the image is retrieved from the flash memory based on validated hardware instructions of the prior boot component. In additional IHS embodiments, the embedded controller is further configured to: retrieve an image of the prior boot component of the sequence of boot components, wherein the image comprises hardware instructions for operation of the prior boot component; calculate a hash based on the hardware instructions of the prior boot component; and verify an integrity of the hardware instructions of the prior boot component based on a comparison of the calculated hash of the prior boot component instructions versus a reference hash of the prior boot component.

In various additional embodiments, an embedded controller is coupled to a flash memory of an Information Handling System (IHS). The embedded controller is configured to: retrieve, from the flash memory, an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions of the current boot component and further based on a hash of hardware instructions of the prior boot component; authenticate the digital signature; calculate a hash based on the hardware instructions of the current boot component and further based on a hash value of hardware instructions for the operation of the prior boot component; compare the calculated hash and the reference hash to verify an integrity of the hardware instructions of current boot component and the hardware instructions of the prior boot component; and initiate validation of a next boot component of the sequence of boot components, wherein the next boot component follows the current boot component in the ordered sequence of boot components. In additional embedded controller embodiments, the image is stored in the flash memory during a trusted assembly procedure of the IHS. In additional embedded controller embodiments, the digital signature is generated by encrypting the reference hash that is based on the hardware instructions of the current boot component and further based on the hash of the prior boot component, and wherein the authentication of the digital signature comprises decrypting the digital signature to recover the reference hash. In additional embedded controller embodiments, the image is retrieved based on validated hardware instructions of the prior boot component. In additional embodiments, the embedded controller is further configured to: retrieve an image of the prior boot component of the sequence of boot components, wherein the image comprises hardware instructions for operation of the prior boot component; calculate a hash based on the hardware instructions of the prior boot component; and verify an integrity of the hardware instructions of the prior boot component based on a comparison of the calculated hash of the prior boot component instructions versus a reference hash of the prior boot component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

As described, a root of trusted hardware components may be used to support secure operations by an IHS. A root of trust may include one or more hardware components that operate using validated hardware instructions, thus providing assurances regarding the integrity of the hardware and software operating within the root of trust. Once a root of trust has been established, the root of trust may be extended by validating additional components and the instructions by which these components operate, thus allowing for secure, iterative validation of a chain of components. In certain instances, a chain of such trusted components may be used during booting of an IHS in order to securely initialize a set of components required to support core functions of the IHS.

However, as described, if one of the components of such a boot chain is compromised, a rogue component may be able to trigger initialization of additional rogue components. Rogue components operating in this manner may operate unbeknownst to validated components of the boot chain, thus providing a malicious actor with broad abilities in bypassing security protocols and taking operational control of an IHS.

Figure 1:
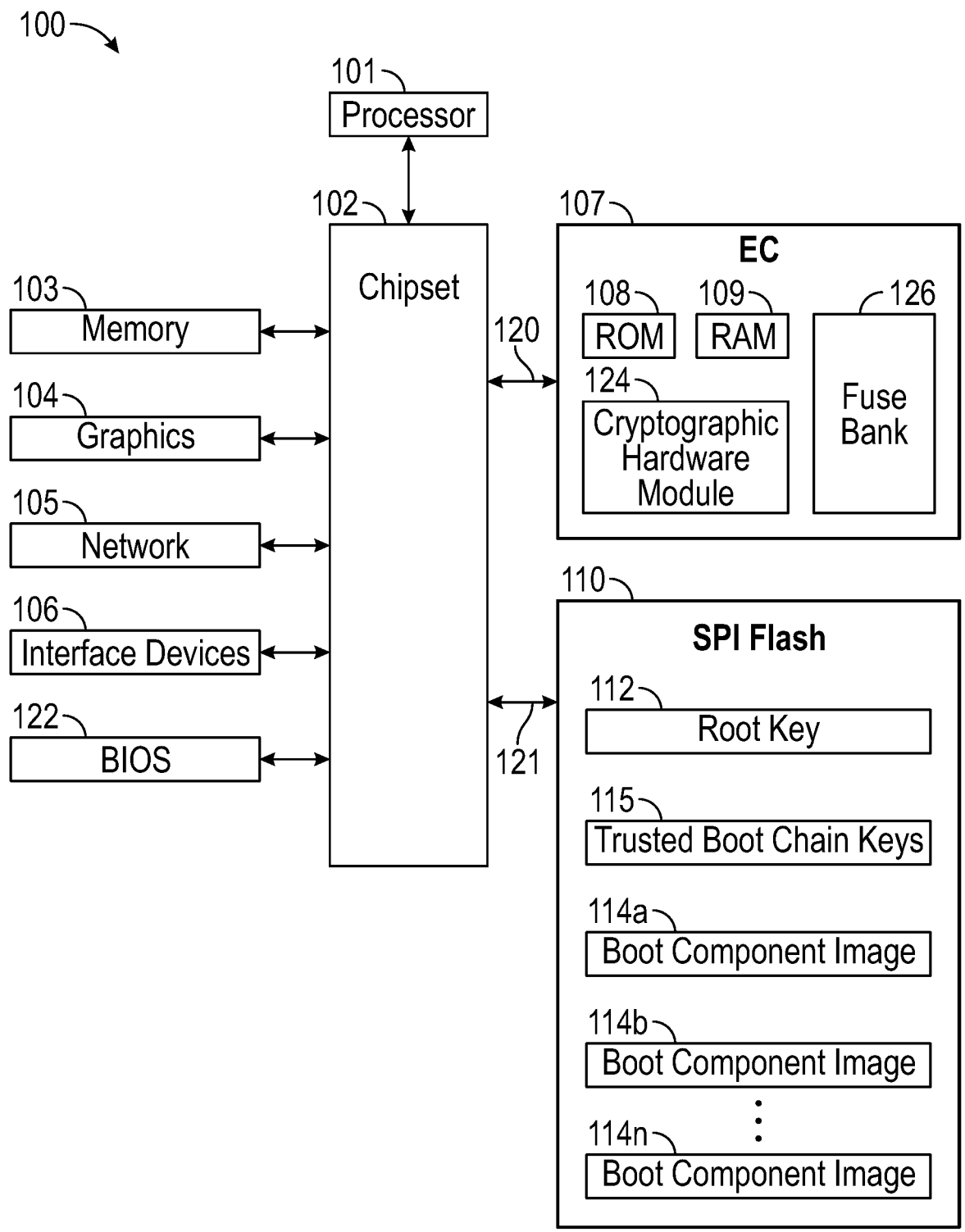
FIG. 1 is a block diagram illustrating certain components of an Information Handling System (IHS) configured, according to some embodiments, for supporting trusted boot procedures that utilize bidirectional trust chaining.

FIG. 1 illustrates an example of components of IHS 100 configured, according to some embodiments, for supporting trusted boot procedures that utilize bidirectional trust chaining. As illustrated, IHS 100 includes a main processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes Platform Controller Hub (PCH) or chipset 102, which may comprise one or more integrated circuits (ICs) coupled to processor 101. In certain embodiments, chipset 102 may utilize a QuickPath Interconnect (QPI) bus to communicate with processor 101. Chipset 102 provides processor 101 with access to a variety of resources. For instance, chipset 102 may provide access to graphics processor 104. In certain embodiments, graphics processor 104 may be part of one or more video or graphics cards installed as components of IHS 100. Graphics processor 104 may be coupled to chipset 102 via a graphics bus such as provided by an AGP (Accelerated Graphics Port) bus or a PCIe (Peripheral Component Interconnect Express) bus. In certain embodiments, a graphics processor 104 generates display signals and provides them to a monitor or other display device.

As illustrated, chipset 102 may be coupled to a network interface 105, such as an interface provided by a Network Interface Controller (NIC). In certain embodiments, network interface 105 may be coupled to chipset 102 via a PCIe bus and may support communications via various wired and/or wireless networks. User interface device(s) 106 may include a keyboard, trackpad, touchscreen controller, microphone, camera, remote control, or any other device configured to enable a human user to interact with IHS 100.

Chipset 102 may also provide access to a system memory 103. System memory 103 may be configured to store program instructions and/or data accessible by processor 101. In various embodiments, system memory may be comprised of multiple removable memory modules. Such removable system memory 103 may correspond to a printed circuit board memory socket that receives a removable memory module, such as a DIMM (Dual In-line Memory Module), that can be coupled to the socket and then decoupled from the socket as needed, such as to upgrade memory capabilities or to replace faulty components. Other embodiments of IHS system memory 103 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

As illustrated, IHS 100 also includes a BIOS (Basic Input/Output System) controller 122 that may be a component of a trusted boot chain. Upon powering or restarting IHS 100, processor(s) 101 may utilize BIOS 122 instructions to initialize and test hardware components coupled to the IHS 100. The BIOS 122 instructions may also load an operating system for use by the IHS 100. The BIOS 122 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, BIOS controller 122 may be a component of a trusted boot chain that may be configured as described herein to support bidirectional validation of boot chain components.

As illustrated, IHS 100 includes an embedded controller (EC) 107 that may be a microcontroller installed on the motherboard of IHS 100, or that may be installed on an expansion card that is coupled to the IHS 100 motherboard. As described in additional detail below, in certain embodiments, embedded controller 107 may be configured as a component of a chain of trusted boot components of IHS 100. In support of such trusted boot chain capabilities, embedded controller 107 may be configured to authenticate firmware instructions using hard-coded, immutable instructions, such as instructions encoded within a ROM 108, in order to establish the embedded controller 107 as a trusted component of a root of trust of IHS 100.

In certain embodiments, the components of a trusted chain of boot components may be organized into an ordered sequence in which one boot component is configured as the initial boot component and the remaining components of the boot chain are configured to follow the initial boot component in an ordered sequence. In such embodiments, a boot chain component, such as embedded controller 107, may be configured to support evaluation of whether any prior component in the chain of trusted boot components has been compromised, as well as providing assurances to any following components in the trusted boot chain that embedded controller 107 has not been compromised. As described in additional detail below, the instructions encoded in ROM 108 may be used to validate the firmware instructions of the embedded controller using cryptographic information encoded within an immutable memory of the embedded controller 107, including the use of cryptographic keys that may encoded within one-time programmable registers of the embedded controller 107 as part of a trusted provisioning process of IHS 100.

In the illustrated embodiment, embedded controller 107 includes a cryptographic hardware module 124. Cryptographic hardware module 124 may implement various cryptographic operations and may be relied on as a trusted authentication resource that is not corruptible without physical access to the embedded controller. In certain embodiments, cryptographic hardware module 124 may include or access a read-only storage that records various cryptographic keys and/or signatures. In certain embodiments, the read-only storage utilized by cryptographic hardware module 124 may be one-time programmable registers, such as a fuse bank 126 in which cryptographic keys may be permanently encoded. Once permanently encoded in this manner, modification of such cryptographic keys and signatures may be extremely difficult without damaging the cryptographic hardware module 124, fuse bank 126 and/or the embedded controller 107. In various embodiments, cryptographic hardware module 124 may be implemented as a system-on-chip, an FPGA, or as other hardware logic integrated into embedded controller 107.

As illustrated, embedded controller 107 may also include two types of internal memories, a non-volatile (Read-Only Memory) ROM 108 and a volatile (Random-Access Memory) RAM 109. In certain embodiments, the ROM 108 may be programmed with instructions that support certain root of trust operations by embedded controller 107. In some embodiments, the ROM 108 instructions may direct the retrieval and authentication of firmware instructions to be utilized by the embedded controller 107.

For instance, the ROM 108 instructions may retrieve firmware instructions for use by the embedded controller 107 from a SPI (Serial Peripheral Interface) Flash 110 memory module of the IHS 100. As described in additional detail with regard to FIG. 3, the firmware instructions for use by a trusted boot chain component such as embedded controller 107 may be stored as a boot component image 114a-n in a secure memory such as SPI Flash 110. In certain embodiments, a boot component image 114a-n includes both hardware instructions for a boot component and information for use in validating the authenticity and integrity of the included hardware instructions. In certain embodiments, the firmware instructions utilized by the embedded controller 107 may be transferred from a boot component image 114a-n stored in SPI Flash 110 memory to the RAM 109 or a cryptographic hardware module 124 for authentication of the firmware instructions. In certain instances, the firmware instructions may be authenticated using cryptographic information stored in one-time programmable registers of a fuse bank 126 or via other immutable storage capabilities.

In certain embodiments, SPI Flash 110 may be a non-volatile memory device capable of being electrically erased and reprogrammed. In certain embodiments, SPI flash 110 may be coupled to the chipset 102 of IHS over an SPI bus 121 that supports transfers of contiguous blocks of data from SPI Flash 110. In certain embodiments, during a trusted provisioning process during the assembly of IHS 100, a cryptographic root key 112 may be stored in SPI Flash 110. In certain instance, the root key 112 may be associated with a trusted signing authority, such as the manufacturer of the IHS, the provider of the chipset used by IHS, or a trusted administrator. In certain embodiments, the embedded controller 107 may be configured, as part of a trusted manufacturing process, to retrieve root key 112, from a root key region of the SPI Flash 110, or from the signing authority associated with the root key. As part of this trusted manufacturing process, the embedded controller 107 may be configured to immutably record the root key 112 by blowing a pattern of fuses to encode the root key within fuse bank 126. Encoded in this manner, the encoded root key 112 cannot be further modified, or at least cannot be modified in a manner that is not readily apparent.

In certain embodiments, the SPI Flash 110 and the fuse bank 126 of embedded controller 107 may be similarly utilized to encode one or more additional cryptographic keys that are associated with other components of the trusted boot chain. As described, embedded controller 107 may be a component in a chain of trusted boot components that may be configured according to embodiments to validate the authenticity and integrity of boot components that precede and follow the embedded controller 107 in the ordered sequence of trusted boot chain components. Accordingly, in some embodiments, in addition to a root key region, the SPI Flash 110 may be configured during a trusted assembly process or trusted service process to include a boot chain region 115 storing cryptographic keys associated with components of the trusted boot chain. In some embodiments, the boot chain region 115 may be used to store public cryptographic keys associated with each component of the trusted boot chain. Some embodiments may only store cryptographic keys associated with the components of the trusted boot chain the immediate precede and follow the embedded controller 107 in the trusted boot chain. Other embodiments may store cryptographic keys associated all components of the trusted boot chain. In certain embodiments, multiple boot chain components may be hosted by the same hardware component, such as embedded controller 107 or BIOS controller 122. Accordingly, one or more boot components may operate on embedded controller 107. In such scenarios, each boot component may be associated with its own boot component image 114a-n and its own encryption keys, even if operating on the same hardware as other components of the trusted boot chain.

SPI Flash 110 may be further divided into various regions 114a-n for storage of boot component images, with each region storing an image for a different component of the trusted boot chain. In certain embodiments, the boot component images stored in regions 114a-n may be provisioned during a trusted assembly process of IHS 100, or during a trusted administration of IHS 100. As described in additional detail with regard to the below embodiments, the images stored in SPI Flash 110 may be retrieved by a component of the trusted boot chain, such as embedded controller 107. Using immutable instructions, such as instructions encoded in ROM 108 of embedded controller 107, boot component images 114a-n may be retrieved and validated.

Figure 3:
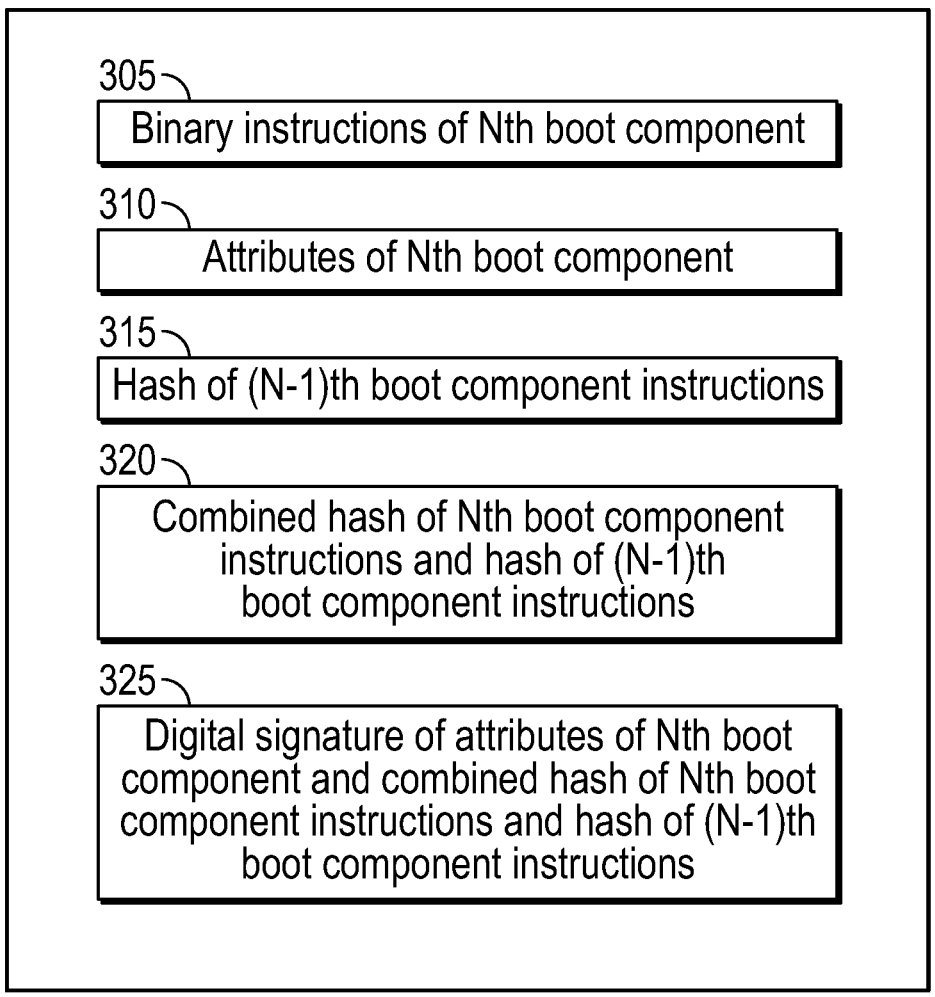
FIG. 3 is block diagram illustrating certain aspect of an image of a component of a trusted boot chain configured for utilizing bidirectional trust chaining according to various embodiments.

As described in additional detail with regard to FIG. 3, the boot component images stored in SPI Flash 110 may include hardware instructions for a specific boot component and may additionally include information for use in authenticating the source of the image and in confirming the integrity of hardware instructions included in the image. As described in additional detail with regard to FIG. 4, the information included in an image may also allow a boot component to validate the immediately preceding component in the boot chain. This capability allows a component of the trusted boot chain to detect when the prior component in the boot chain has been compromised. In various embodiments, SPI Flash 110 may also include various other types of regions and/or partitions in addition to the regions illustrated in FIG. 1

In various embodiments, IHS 100 may not include each of the components shown. Additionally, or alternatively, IHS 100 may include components other than those that are shown (e.g., additional storage and user interface devices, controllers, USB ports, etc.). Furthermore, some of the components that are represented as separate components may, in some implementations, be integrated with other components. In various embodiments, all or a portion of the functionality provided by the illustrated components may instead be provided by components integrated into processor 101 as a system-on-a-chip (SOC) or the like.

Figure 2:
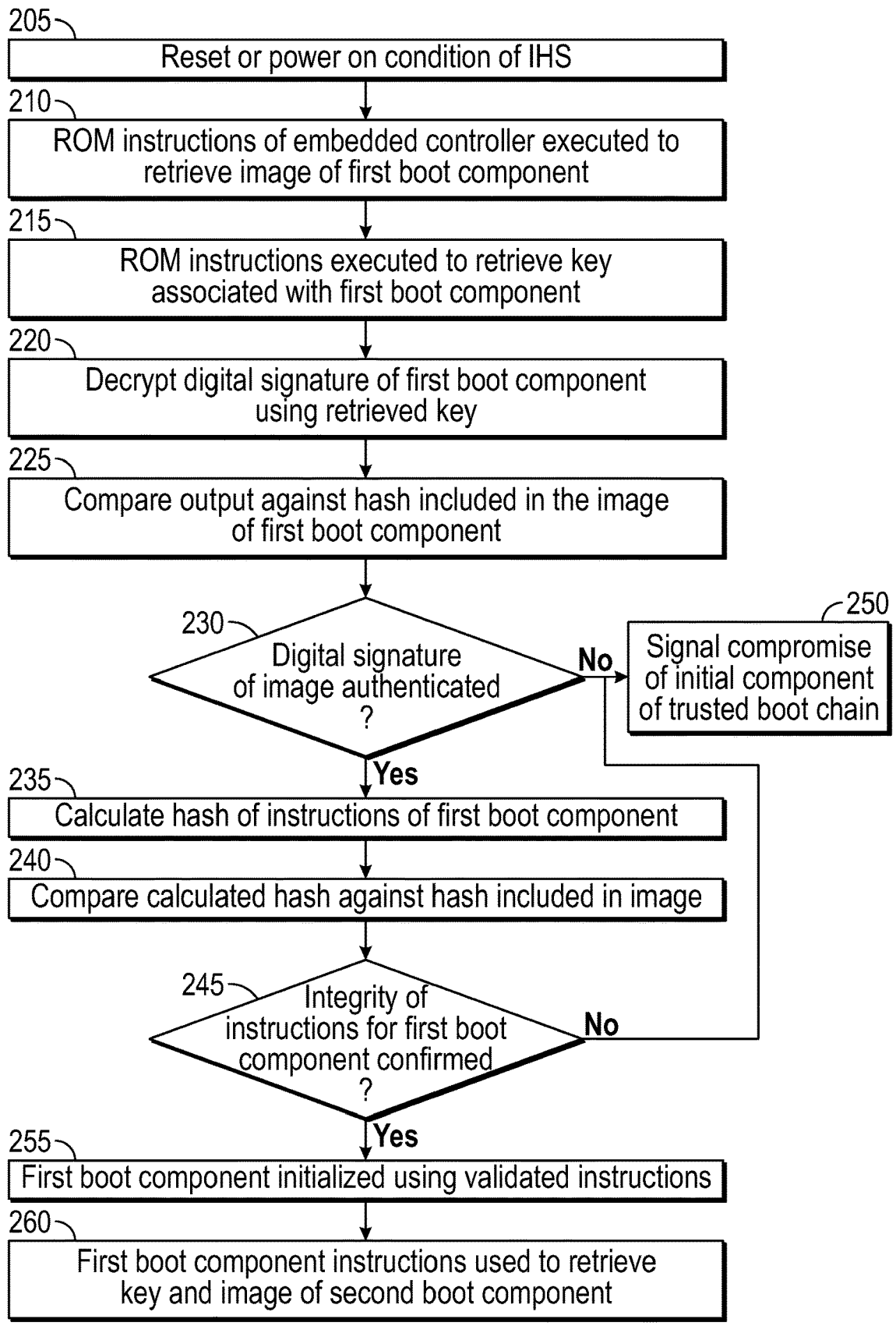
FIG. 2 is flowchart illustrating certain steps of a method according to various embodiments for supporting trusted boot procedures that utilize bidirectional trust chaining.

FIG. 2 is flowchart illustrating certain steps of a method according to various embodiments for supporting trusted boot procedures that utilize bidirectional trust chaining. In the embodiment of FIG. 2, an IHS has been configured during a trusted assembly or administrative process such that cryptographic keys and hardware instructions for use by trusted boot chain components have been stored to a SPI Flash or other secure memory of the IHS. As described with regard to FIG. 1, in certain instances, such keys may be encoded within a fuse bank of an embedded controller or in another immutable memory of the IHS. The provisioning during the trusted assembly or administrative process may also include storing one or more images corresponding to trusted boot chain components in a secured memory of an IHS, such as the SPI Flash of the embedded controller of FIG. 1. In addition, the trusted assembly process may immutably encode certain instructions in a ROM of a boot chain component, such as the ROM of the embedded controller of FIG. 1. Using such immutable instructions, the trusted boot chain procedure validates it's own instructions and the instructions in use by the prior component of the boot chain.

Figure 4:
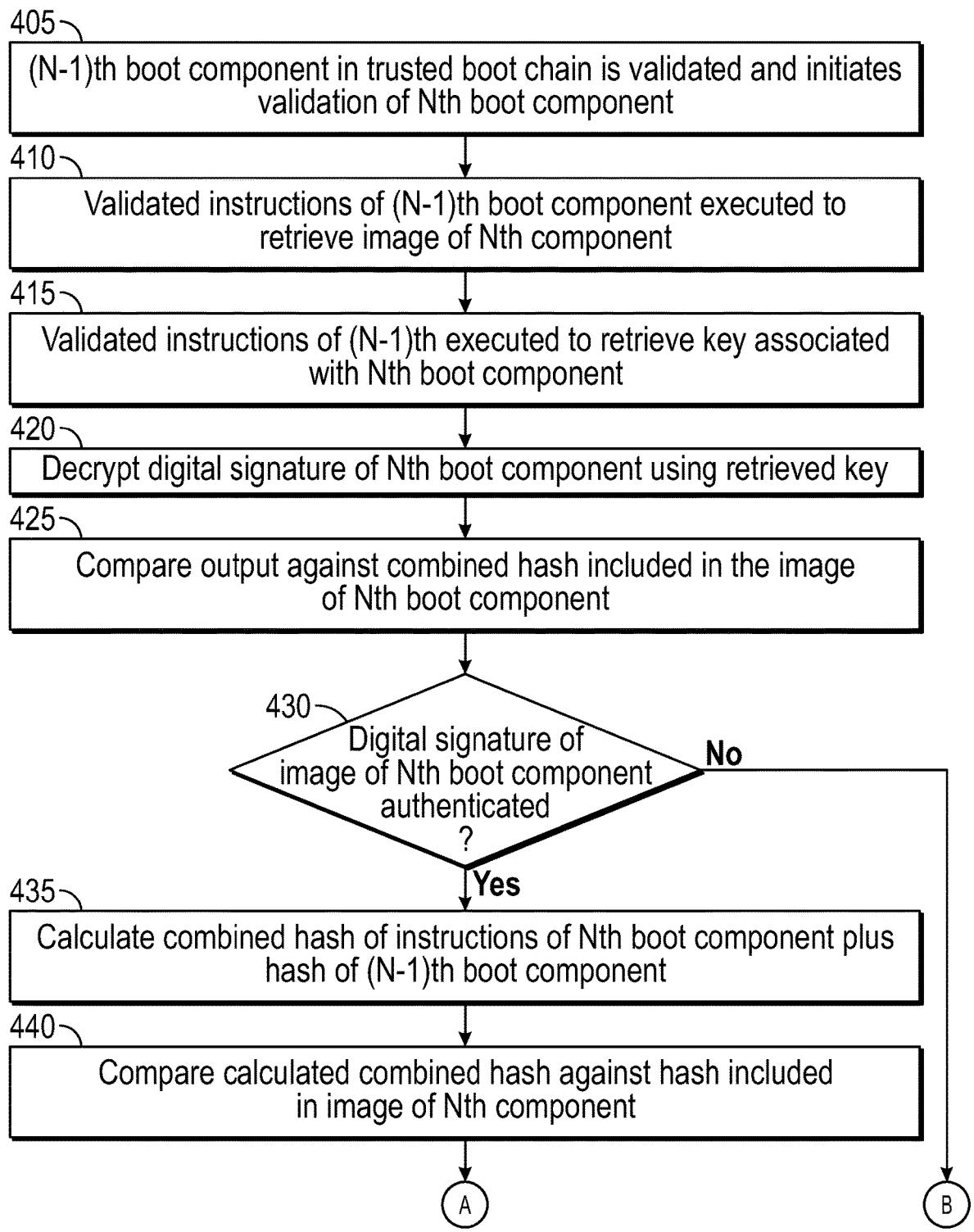
FIG. 4 is flowchart illustrating certain steps of a method according to various embodiments for supporting trusted boot procedures that utilize bidirectional trust chaining.
Figure 4:
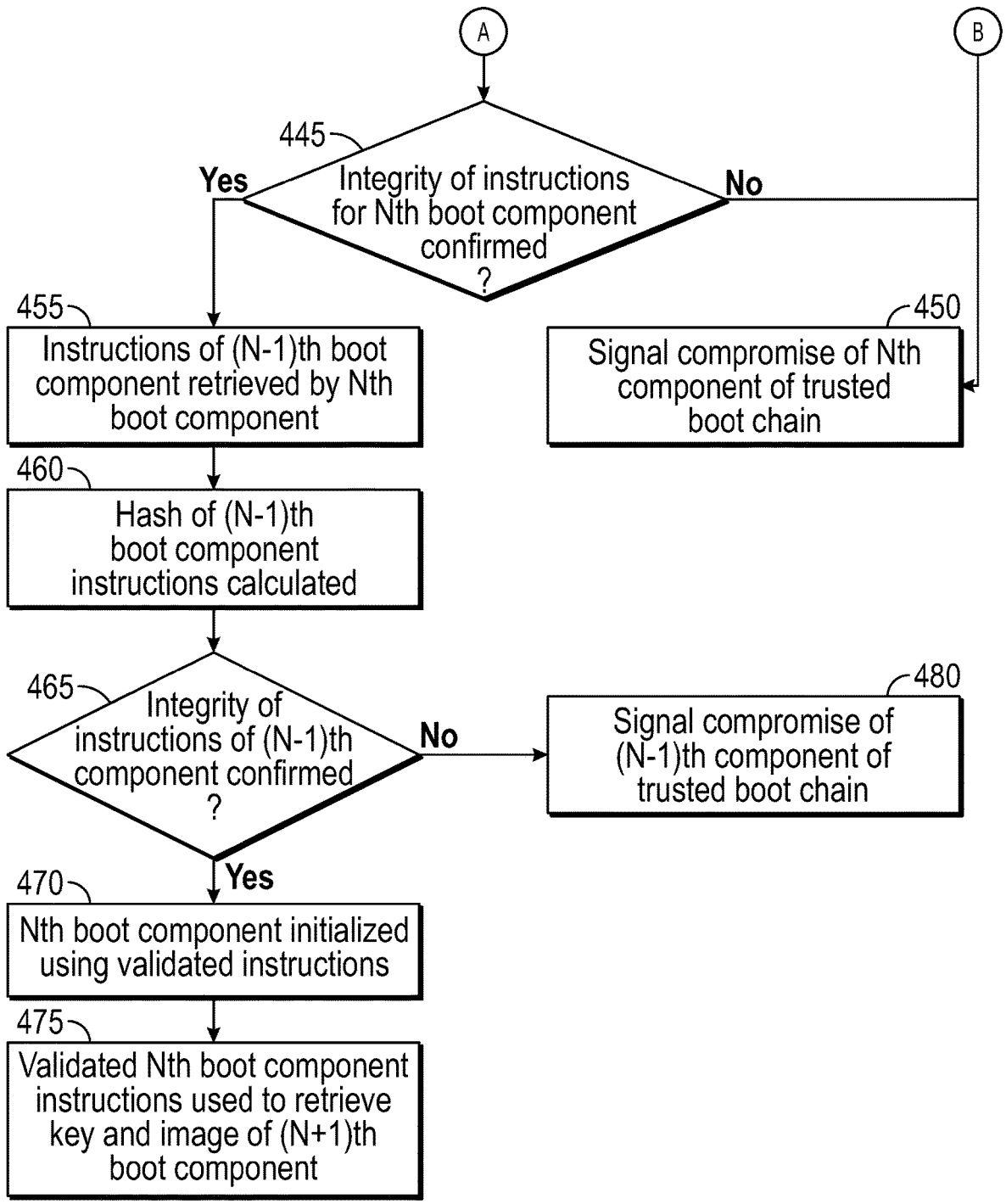

The flowchart of FIG. 2 provides illustrative steps of a process according to embodiments for initializing the first component of a bidirectional trusted boot chain. FIGS. 3 and 4 illustrate aspects of a technique according to embodiments for initializing subsequent boot components of the trusted boot chain. In addition to describing illustrative processes for initializing an IHS utilizing a bidirectional trusted boot chain, the following description also describes various aspects of the assembly and configuration of an IHS to support the described trusted bidirectional boot chain procedures.

The illustrated embodiment begins, at block 205, with the powering or resetting of an IHS that has been configured to utilize the described bidirectional trusted boot chain procedures. In certain embodiments, upon being powered or reset, the embedded controller or another component tasked with initiating the trusted boot chain, such as a BIOS controller, may be configured to pause further initialization of the IHS until the trusted chain of boot components has been initialized and a root of trust has been established in a set of validated hardware components. FIG. 2 describes aspects of a process for initiating a bidirectional trusted boot chain by establishing the authenticity and integrity of the hardware instructions utilized by the initial component of the trusted boot chain.

At block 210, the initial component in the bidirectional trusted boot chain, such as the embedded controller 107 of FIG. 1, boots from a ROM-based boot block, such as from a boot code region of ROM 108 utilized by the embedded controller. The ROM of the embedded controller may be configured with instructions that, upon execution, cause the embedded controller to retrieve the image of the first component of the trusted boot chain. As described, images for trusted components of the boot chain may be stored to a secure memory of an IHS, such as the SPI Flash 110 of FIG. 1, as part of a trusted assembly or service process. In certain embodiments, the first component of the bidirectional trusted boot chain may implement support for certain core functions of IHS, some of which may be used in retrieving and validating the next component of the trusted boot chain.

As described in additional detail with regard to FIG. 3, an image for a boot chain component according to embodiments may include the binary hardware instructions to be utilized by that particular component, as well as including information used in verifying the authenticity and the integrity of the hardware instructions provided in the image. In order to provide assurances of the source of the hardware instructions, an image of a trusted boot chain component may include a digital signature that may be used to authenticate the provider of the image and to confirm that the information signed using the digital signature have not been modified. In certain embodiments, the digital signature for an image of an initial boot chain component may be generated through use of a private key associated with an organization providing the initial boot chain component, where the private key is used to encrypt a hash of the hardware instructions that are being provided in the initial boot component image. In order to verify the authenticity of the digital signature, at block 215, the ROM instructions of the first component of the trusted boot chain may be executed to retrieve a public key associated with the organization providing the first boot component.

Using the retrieved public key, at block 220, the first component of the trusted boot chain may decrypt the digital signature provided in the image of the first boot chain component. As described with regard to FIG. 1, an embedded controller 107 may include a cryptographic hardware module 124 for use in implementing such cryptographic functions. In such embodiments, the ROM 108 of the embedded controller 107 may be configured to rely on the cryptographic hardware module 124 for cryptographic operations, such as using the retrieved public key in decrypting the digital signature of the initial boot component image of the boot chain. At block 225, the output resulting from the decryption of the digital signature may be compared against the hash included in the image of the first boot chain component. In scenarios where the hash included in an image of the first boot component is generated based on the binary hardware instructions of the first boot component, if the output generated by decrypting the digital signature matches the hash in the image, at block 230, the hash included in the image of the first boot component is authenticated as being signed by the holder of the private key corresponding to the public key used at block 220. If the digital signature is not successfully authenticated, at block 250, the embedded controller may signal that the initial component of the boot chain has been compromised.

In scenarios where the digital signature of the initial boot component is successfully authenticated, at block 235, the initial boot component continues by verifying the integrity of the binary hardware instructions included in the image. For instance, the initial boot component may calculate a hash of the binary instructions included in the image. In embodiments where the initial boot component is the embedded controller of FIG. 1, the embedded controller may rely on a cryptographic hardware module for calculating such hash values. At block 240, the calculated hash value is compared against the hash provided in image of the first boot component. Based on this comparison, at block 245, the integrity of the binary instructions included in the image of the first boot component is determined. If the calculated hash does not match the hash included in the image, this indicates the presence of modifications to the binary instructions. Accordingly, at block 250, the embedded controller may signal that the initial component of the boot chain has been compromised.

In scenarios where the calculated hash value matches the hash value that is provided in the image of the first boot component, the integrity of the binary instructions included in the image is verified. With the authenticity and integrity of the instructions of the first boot component verified, at block 255, the first component of the boot chain may be initialized using the binary instructions included in the image. The first boot chain component may be fully or partially initialized using the validated binary instructions. In certain embodiments, the validated hardware instructions of the initial boot component image may be utilized to retrieve a public key and image associated with the second component in the trusted boot chain. In certain embodiments, a second component of the trusted boot chain may be an additional component of the same hardware device hosting the first boot component, such as a first and a second boot chain component both being hosted by the embedded controller of FIG. 1. In other embodiments, a second component of the trusted boot chain may be a component on a separate hardware device from the hardware device hosting the first boot chain component. Accordingly, once validated, the hardware instructions of the first boot chain component may initiate the validation of the second boot chain component, whether it be on the same or different hardware device of the IHS as the first boot chain component.

FIG. 3 is block diagram illustrating certain aspect of an image of a component of a trusted boot chain configured for utilizing bidirectional trust chaining according to various embodiments. As described, an IHS may be provisioned during a trusted assembly or trusted service process to support a chain of trusted boot components that are iteratively validated and initialized. During this provisioning, the IHS may be configured with one or more keys, such as public keys associated with providers of trusted components of the boot chain. Also as described, this trusted provisioning process may also include storing images associated with one or more components of the trusted boot chain in a secure memory of an IHS. FIG. 2 describes how the information provided in such an image may be used to authenticate the provider of the first boot component and to validate the integrity of the hardware instructions provided in the image for operation of the first boot component. In the image described with regard to FIG. 3, the image 300 supports bidirectional trust chaining for the components of the boot chain that follow the first boot component of the boot chain. FIG. 4 provides a method by which the image 300 of FIG. 3 may be utilized in bidirectional trust chaining.

As illustrated in FIG. 3, a boot component image 300 may include the hardware instructions 305 for use by an arbitrary component in a trusted boot chain, where this arbitrary (i.e., Nth) boot component is not the initial component of the boot chain. In certain embodiments, the hardware instructions 305 provided in image 300 are binary firmware instructions for use in supporting some or all of the functions of the Nth component of the boot chain, such as a component of the embedded controller of FIG. 1, a BIOS controller or another trusted hardware component of the IHS. As described, if the hardware instructions 305 provided in an image are compromised and modifications to the image are not detected, a boot component may be initialized and configured to operate according to rogue instructions. Components of a trusted boot chain according to the described embodiments provide a technique for validating a component of a boot chain and also validating the previous component in the boot chain.

In support of validating the integrity of both the Nth boot component and the previous (i.e., (N−1)th) boot component, the image 300 includes at least two different hash values. The first hash 315 included in the image of the Nth component is a hash of the hardware instructions of the prior (i.e., (N−1)th) boot component in the boot chain. The second hash 320 included in the image of the Nth component is a combined hash that has been calculated based on a combination of the hardware instructions of the Nth boot component and the hash of the hardware instructions of the prior (i.e., (N−1)th) boot component. As described in additional detail with regard to FIG. 4, these hash values 315 and 320 may be utilized in order to validate the integrity of the binary instructions of the Nth boot component 305 and also to validate the integrity of the instructions being utilized by the prior (i.e., (N−1)th) boot component.

As illustrated, an image 300 may also include a digital signature 325 used to verify the authenticity of the source of the image 300. As described, an image 300 may include hardware instructions 305 by which a Nth component of the trusted boot chain operates. In certain embodiments, an image 300 may also include attributes 310 or other data for use in configuring the Nth boot component, such as configurations for operation on a particular host IHS and/or information for identifying the prior (i.e., (N−1)th) and following (i.e., (N+1)th) boot components in the trusted boot chain.

In certain embodiments, the digital signature 325 included within an image 300 of an Nth component of the boot chain may be signed during provisioning of an IHS using the private key of the provider of the Nth component. In some embodiments, the digital signature 325 may be generated through encrypting both the attributes 310 used by the Nth boot component and the combined hash 320 that is based on the hardware instructions of Nth boot component and the hash of the instructions of the prior (i.e., (N−1)th) boot component. As described in additional detail with regard to FIG. 4, verification of the digital signature 325 serves to authenticate the provider of the instructions of the Nth boot component and the hash of the prior (i.e., (N−1)th) boot component instructions. When attributes 310 are included in the digital signature, the authentication of the digital signature serves to confirm that the attributes included in the image 300 have not been modified.

FIG. 4 is flowchart illustrating certain steps of a method according to various embodiments for supporting trusted boot procedures that utilize bidirectional trust chaining. As described with regard to FIG. 2, the integrity and authenticity of an image of an initial component of a trusted chain of boot components may be validated based on the digital signature and hash codes included within the image provided for that initial component. Also as described, upon successful validation of this initial boot component, the validated instructions of the initial boot component may be executed in order to initiate validation of the next boot component in the trusted boot chain. The embodiment of FIG. 4 begins at block 405 with the invocation of an arbitrary (i.e., Nth) boot component of the boot chain by the prior (i.e., (N−1)th) component in the trusted boot chain, such as by the initial boot component described with regard to FIG. 2.

In order to validate the instructions provided for the Nth boot component, at block 410, the validated instructions of the (N−1)th component of the trusted boot chain may be executed to retrieve the image of the Nth component, such as the image 300 described with regard to FIG. 3. As described, images for the components of the trusted boot chain may be provisioned during a trusted assembly or configuration of the host IHS, such as through storage to secure memory devices supported by the respective components of the trusted boot chain. At block 415, additional ROM instructions of the (N−1)th component of the trusted boot chain may be executed to retrieve a public key associated with the organization providing the Nth component.

Using the retrieved public key, at block 420, the (N−1)th component of the trusted boot chain may decrypt the digital signature included in the image of the Nth boot chain component. As described with regard to FIG. 1, a boot chain component such as embedded controller 107 may include a cryptographic hardware module 124 for cryptographic operations, such as using the retrieved public key in decrypting the digital signature of a boot component image.

At block 425, the output resulting from the decryption of the digital signature is compared against the hash included in the image of the Nth boot chain component. As described with regard to FIG. 3, a combined hash 320 may be included in an image 300 of an Nth component of a boot chain, where the combined hash 320 is generated based on the hardware instructions of the Nth boot component 305 combined with the hash of the instructions of the previous (N−1)th boot component. In some embodiments, the digital signature may also include attributes for use in configuring the Nth boot component.

If the output generated by decrypting the digital signature matches the combined hash included in the image of the Nth component, at block 430, the digital signature contents are authenticated as being signed by the holder of the private key corresponding to the public key used at block 420. If the digital signature is not successfully authenticated, at block 450, the validated instructions of the (N−1)th boot chain component may signal that the Nth boot component has been compromised. In scenarios where the digital signature of the Nth boot component is authenticated, at block 435, additional validated instructions of the (N−1)th boot component are utilized in verifying the integrity of the binary instructions of Nth component that are included in the image.

In certain embodiments, the validated instructions of the (N−1)th boot component may be used to calculate a combined hash that is based on a combination of the binary hardware instructions 305 included in the image 300 of the Nth boot chain component and the hash of the (N−1)th boot component hardware instructions. At block 440, the calculated combined hash value is compared against the combined hash 320 provided in image 300 of the Nth boot component.

Based on this comparison, at block 445, the integrity may be verified of the binary instructions included in the image of the Nth boot component in combination with the hash of the instructions used by the (N−1)th boot component. If the calculated combined hash does not match the combined hash included in the image of the Nth boot component, this indicates the presence of modifications to the hardware instructions provided for the Nth component or to the hash of the instructions of the (N−1)th boot component. Accordingly, at block 450, in such scenarios, the (N−1)th boot component may signal that the boot chain has been compromised.

In scenarios where the calculated combined hash value matches the combined hash value 320 provided in the image 300 of the Nth boot component, at block 455, the hardware instructions for use by the Nth boot component are validated and the Nth boot component is initialized based on these validated instructions. As described, if a component of a boot chain is compromised and the breach is undetected, the components that follow the compromised component in the boot chain may be manipulated using instructions loaded by the compromised component. Accordingly, embodiments provide a capability for boot chain components to validate the instructions used by the prior component in a boot chain. As described, the (N−1)th boot component may be configured to validate the integrity and authenticity of the hardware instructions to be loaded by the Nth boot component from the image of the Nth boot component, thus providing assurances that the following component in the boot chain has not been compromised.

In supporting bidirectional validation of components of a boot chain, at block 455, the trust chaining procedure moves to the Nth component in the boot chain. Utilizing the hardware instructions of the Nth component, now validated by the (N−1)th component, the Nth component retrieves the hardware instructions that were loaded and are in use by the (N−1)th component. The Nth component may retrieve these hardware instructions from the image provided for the (N−1)th component, such as from the SPI Flash or other secure memory of the IHS used to store boot chain component images. At block 460, the Nth component calculates a hash of the retrieved instructions of the (N−1)th component.

The Nth component of the boot chain, at block 465, determines whether the (N−1)th component has been compromised by comparing the calculated hash against the hash 315 of the of the (N−1)th component hardware instructions that is included in the Nth component image, and previously used to calculate the combined hash 320 and signed as part of the digital signature 325 of the Nth component. If the hash calculated by the Nth boot component does not match the provided hash of the (N−1)th component hardware instructions, at block 480, the Nth component signals that the (N−1)th component has been compromised.

If the hardware instructions of the (N−1)th component are validated, at block 470, the Nth component of the boot chain may continue operations using the binary instructions 305 included in the image 300 of the Nth component. The hardware component hosting the Nth boot chain component may be fully or partially initialized using the binary instructions 305 of the Nth boot chain component. In scenarios where the Nth boot component is not the terminal component in boot chain embodiments, the binary instructions 305 of the Nth boot component may be utilized to retrieve a public key and image associated with the next, (N+1)th, component in the trusted boot chain. In the same manner as the validation of the Nth boot component, at block 475, the binary instructions of the Nth boot chain component may initiate the validation of the following (N+1)th boot chain component, whether it be on the same or different hardware component of the IHS as the Nth boot chain component.

As described, after the first boot chain component, each boot chain component may be configured to validate the hardware instructions of the next boot chain component and to validate the hardware instructions of the prior boot chain component, thus supporting bidirectional validation of the boot chain components. Configured in this manner, the supported bidirectional validation of boot chain components prevents components from being loaded by a rogue prior component, (N−1)th, of the boot chain and also preventing boot chain components from loading a rogue following component, (N+1)th, of the boot chain. By supporting bidirectional validation of boot chain components, rogue boot chain components may be detected and prevented from compromising the entire boot chain and the IHS utilizing the boot chain.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating an ordered sequence of boot components of an Information Handling System (IHS), the method comprising:
   retrieving an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions for use by the current boot component and further based on a hash of hardware instructions for use by the prior boot component;
   authenticating the digital signature;
   calculating a hash based on the hardware instructions that will be used to operate the current boot component and further based on a hash value of hardware instructions in use by for the prior boot component;
   comparing the calculated hash and the reference hash to verify an integrity of the hardware instructions that will be used to operate the current boot component and the hardware instructions in use by the prior boot component, wherein a match between the calculated hash and the reference hash confirms the instructions that will be used to operate the current boot component and the instructions in use by the prior boot component have not been compromised; and
   initiating validation of a next boot component of the sequence of boot components, wherein the next boot component directly follows the current boot component in the ordered sequence of boot components.

2. The method of claim 1, wherein the image is stored on a memory device of the IHS during a trusted assembly procedure of the IHS.

3. The method of claim 1, wherein the digital signature is generated by encrypting the reference hash that is based on the hardware instructions for use by the current boot component and further based on the hash of the hardware instructions for use by the prior boot component.

4. The method of claim 3, wherein the authentication of the digital signature comprises decrypting the digital signature to recover the reference hash.

5. The method of claim 3, wherein the image further comprises attributes for configuring the current boot component and wherein the digital signature is further generated based on encrypting the attributes.

6. The method of claim 1, wherein the image is retrieved based on validated hardware instructions of the prior boot component.

7. The method of claim 1, further comprising:
   retrieving an image of the prior boot component of the sequence of boot components, wherein the image comprises hardware instructions for operation of the prior boot component;
   calculating a hash based on the hardware instructions of the prior boot component; and
   verifying an integrity of the hardware instructions of the prior boot component based on a comparison of the calculated hash of the prior boot component instructions versus a reference hash of the prior boot component.

8. The method of claim 7, wherein the image of the current boot component comprises the reference hash of the prior boot component.

9. An Information Handling System (IHS) comprising:
   a flash memory; and
   an embedded controller coupled to the flash memory, wherein the embedded controller is configured to:
      retrieve, from the flash memory, an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions for use by the current boot component and further based on a hash of hardware instructions for use by the prior boot component;
      authenticate the digital signature;
      calculate a hash based on the hardware instructions that will be used to operate the current boot component and further based on a hash value of hardware instructions in use by the operation of the prior boot component;
      compare the calculated hash and the reference hash to verify an integrity of the hardware instructions that will be used to operate the current boot component and the hardware instructions in use by the prior boot component, wherein a match between the calculated hash and the reference hash confirms the instructions that will be used to operate the current boot component and the instructions in use by the prior boot component have not been compromised; and
      initiate validation of a next boot component of the sequence of boot components, wherein the next boot component directly follows the current boot component in the ordered sequence of boot components.

10. The IHS of claim 9, wherein the image is stored in the flash memory during a trusted assembly procedure of the IHS.

11. The IHS of claim 9, wherein the digital signature is generated by encrypting the reference hash that is based on the hardware instructions for use by the current boot component and further based on the hash of the hardware instructions for use by the prior boot component.

12. The IHS of claim 11, wherein the authentication of the digital signature comprises decrypting the digital signature to recover the reference hash.

13. The IHS of claim 11, wherein the image further comprises attributes for configuring the current boot component and wherein the digital signature is further generated based on encrypting the attributes.

14. The IHS of claim 9, wherein the image is retrieved from the flash memory based on validated hardware instructions of the prior boot component.

15. The IHS of claim 9, wherein the embedded controller is further configured to:
    retrieve an image of the prior boot component of the sequence of boot components, wherein the image comprises hardware instructions for operation of the prior boot component;
    calculate a hash based on the hardware instructions of the prior boot component; and
    verify an integrity of the hardware instructions of the prior boot component based on a comparison of the calculated hash of the prior boot component instructions versus a reference hash of the prior boot component.

16. An embedded controller coupled to a flash memory of an Information Handling System (IHS), wherein the embedded controller is configured to:
    retrieve, from the flash memory, an image of a current boot component of the sequence of boot components, wherein the current boot component follows a prior boot component in the ordered sequence of boot components, and wherein the image comprises hardware instructions for operation of the current boot component, and wherein the image further comprises a digital signature, and wherein the image further comprises a reference hash that is based on the hardware instructions for use by the current boot component and further based on a hash of hardware instructions for use by the prior boot component;
    authenticate the digital signature;
    calculate a hash based on the hardware instructions that will be used to operate the current boot component and further based on a hash value of hardware instructions in use by the operation of the prior boot component;
    compare the calculated hash and the reference hash to verify an integrity of the hardware instructions that will be used to operate the current boot component and the hardware instructions in use by the prior boot component, wherein a match between the calculated hash and the reference hash confirms the instructions that will be used to operate the current boot component and the instructions in use by the prior boot component have not been compromised; and
    initiate validation of a next boot component of the sequence of boot components, wherein the next boot component directly follows the current boot component in the ordered sequence of boot components.

17. The embedded controller of claim 16, wherein the image is stored in the flash memory during a trusted assembly procedure of the IHS.

18. The embedded controller of claim 16, wherein the digital signature is generated by encrypting the reference hash that is based on the hardware instructions for use by the current boot component and further based on the hash of the hardware instructions for use by the prior boot component, and wherein the authentication of the digital signature comprises decrypting the digital signature to recover the reference hash.

19. The embedded controller of claim 16, wherein the image is retrieved based on validated hardware instructions of the prior boot component.

20. The embedded controller of claim 16, wherein the embedded controller is further configured to:
    retrieve an image of the prior boot component of the sequence of boot components, wherein the image comprises hardware instructions for operation of the prior boot component;
    calculate a hash based on the hardware instructions of the prior boot component; and
    verify an integrity of the hardware instructions of the prior boot component based on a comparison of the calculated hash of the prior boot component instructions versus a reference hash of the prior boot component.

* * * * *